United States Patent
Kritzer et al.

(10) Patent No.: US 8,647,758 B2
(45) Date of Patent: Feb. 11, 2014

(54) ELECTROCHEMICAL ENERGY STORAGE DEVICE

(75) Inventors: Peter Kritzer, Forst (DE); Thomas Klenk, Dossenheim (DE)

(73) Assignee: Carl Freudenberg, KG, Weinheim (DE)

( * ) Notice: Subject to any disclaimer, the term of this patent is extended or adjusted under 35 U.S.C. 154(b) by 403 days.

(21) Appl. No.: 12/855,252

(22) Filed: Aug. 12, 2010

(65) Prior Publication Data

US 2011/0045324 A1 Feb. 24, 2011

(30) Foreign Application Priority Data

Aug. 24, 2009 (EP) .................................. 09010805

(51) Int. Cl.
*H01M 10/42* (2006.01)
*H01M 10/34* (2006.01)
*H01M 10/52* (2006.01)

(52) U.S. Cl.
USPC ................ 429/53; 429/163; 429/176; 429/56

(58) Field of Classification Search
USPC .................. 429/53–56, 163, 175–176, 72, 82
See application file for complete search history.

(56) References Cited

U.S. PATENT DOCUMENTS

| | | | | | |
|---|---|---|---|---|---|
| 2,457,800 | A | * | 1/1949 | Allen | 429/85 |
| 2,743,035 | A | * | 4/1956 | Fogarty | 220/88.2 |
| 3,285,784 | A | * | 11/1966 | Babusci et al. | 429/174 |
| 3,514,341 | A | | 5/1970 | Cook | |
| 3,673,001 | A | * | 6/1972 | Tolmie | 429/61 |
| 4,517,261 | A | * | 5/1985 | Whittlesey | 429/64 |
| 5,128,218 | A | * | 7/1992 | Tokunaga et al. | 429/57 |
| 5,538,807 | A | * | 7/1996 | Hagiuda | 429/100 |
| 5,585,209 | A | * | 12/1996 | Feldstein | 429/210 |
| 5,876,872 | A | * | 3/1999 | Feezor | 429/118 |
| 6,322,921 | B1 | * | 11/2001 | Iwaizono et al. | 429/56 |
| 7,041,412 | B2 | * | 5/2006 | Ishida et al. | 429/57 |
| 7,572,544 | B2 | * | 8/2009 | Kozuki et al. | 429/53 |
| 2003/0113615 | A1 | * | 6/2003 | Tomazic | 429/70 |
| 2009/0053586 | A1 | * | 2/2009 | Fredriksson et al. | 429/57 |
| 2009/0155672 | A1 | * | 6/2009 | Asahina et al. | 429/54 |
| 2012/0015218 | A1 | * | 1/2012 | Lee | 429/53 |
| 2012/0015219 | A1 | * | 1/2012 | Wang et al. | 429/53 |
| 2012/0021260 | A1 | * | 1/2012 | Yasui et al. | 429/53 |
| 2013/0095352 | A1 | * | 4/2013 | Yamauchi et al. | 429/53 |
| 2013/0177801 | A1 | * | 7/2013 | Armacanqui et al. | 429/163 |
| 2013/0196185 | A1 | * | 8/2013 | Yokoyama et al. | 429/53 |
| 2013/0196186 | A1 | * | 8/2013 | Yokoyama et al. | 429/53 |

FOREIGN PATENT DOCUMENTS

| | | | | |
|---|---|---|---|---|
| DE | 1421216 A1 | 10/1968 | | |
| DE | 2310403 A1 | 9/1974 | | |
| DE | 4210431 C1 | 4/1993 | | |
| DE | 102007017018 A1 | * | 3/2008 | ............. H01M 2/20 |
| JP | 09-017401 | * | 6/1995 | ............. H01M 2/02 |
| JP | 9017401 A | 1/1997 | | |
| WO | 2008120056 A1 | 10/2008 | | |

\* cited by examiner

*Primary Examiner* — Joseph S Del Sole
*Assistant Examiner* — Nahida Sultana
(74) *Attorney, Agent, or Firm* — Harness, Dickey & Pierce, P.L.C.

(57) ABSTRACT

An electrochemical energy storage device provides problem-free pressure compensation at a permanently high imperme-ability, includes a storage housing (1), which encases a volume, in which cells are accommodated, wherein the storage housing (1) protects the volume from the surroundings, and includes a volume compensation device (2), which compensates pressure differences between the interior of the storage housing (1) and the surroundings without a material replacement between the surroundings and the interior of the storage housing (1).

12 Claims, 5 Drawing Sheets

FIG 15
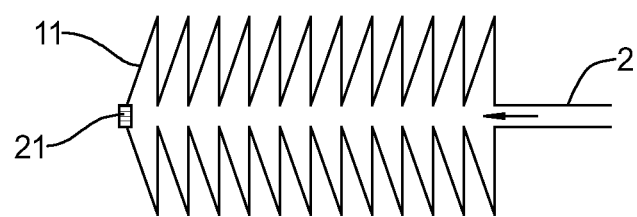
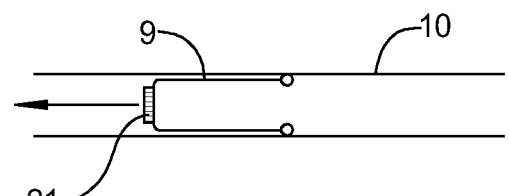
FIG 16

FIG 17
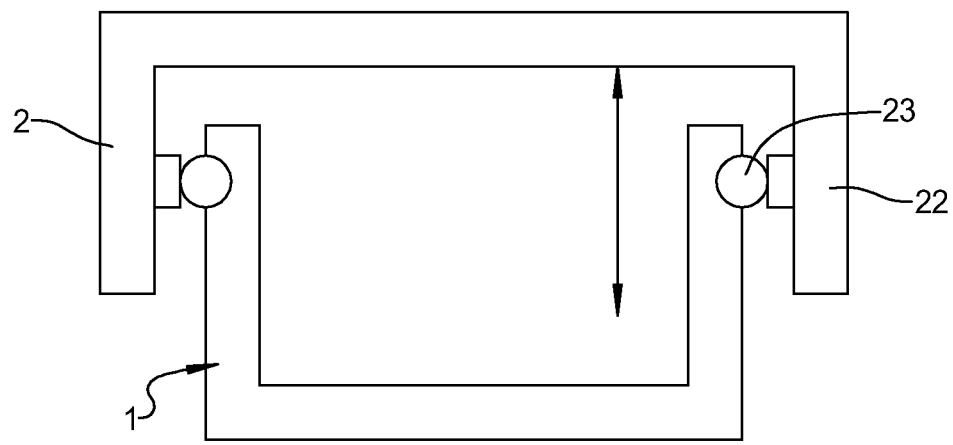
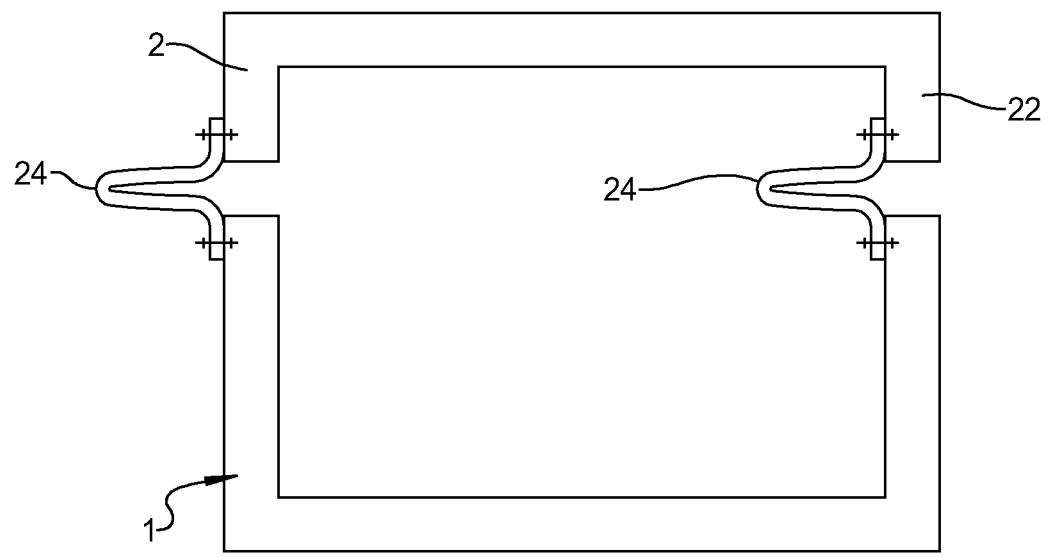
FIG 18

ELECTROCHEMICAL ENERGY STORAGE DEVICE

CROSS-REFERENCE TO RELATED APPLICATIONS

This application claims the benefit and priority of EP09010805.1, filed Aug. 24, 2009. The entire disclosure of the above application is incorporated herein by reference.

FIELD

The present disclosure relates to an energy storage device comprising a storage housing, which encases a volume, in which cells are accommodated, wherein the storage housing protects the volume from the surroundings.

BACKGROUND

This section provides background information related to the present disclosure which is not necessarily prior art.

Cells, which are hermetically protected, are located in large battery housings. As a rule, these cells are cooled by means of contact cooling. The temperature within the battery housing is thereby lower than the temperature outside of the battery housing. The contact cooling either comprises non-pressurized systems, which include water-based media, such as water-glycol mixtures or proper air conditioning systems, which operate with fluorocarbon or carbon dioxide.

Typical volumes of batteries, which are used in hybrid and electric vehicles, are more than 50 l (l=liter). Batteries of electric vehicles even encompass volumes, which are greater than 100 l.

Against this background, a battery housing typically contains an inevitable dead volume of approx. 5% of the entire volume of the battery. However, depending on the embodiment of the cells, this dead volume can also be considerably larger. In particular, geometrically disadvantageous round cells allow for only a relatively small use of space.

Slight excess pressures as well as low pressures can be created in a hermetically, in particular isochorically sealed battery housing due to pressure fluctuations, which are caused by temperature fluctuations. They are critical in particular for the sealing of the cells, which are installed in the battery, and impact the service life of the entire battery system.

Larger pressure fluctuations can furthermore have negative impacts on further battery components, in particular the electric power and control contacting of the cells as well as the seals of the housing lead-through of cables.

In the currently practiced embodiment [Lamm et al.: Lithium-Ionen-Batterie. Erster Serieneinsatz im S400 Hybrid (Lithium-Ion Battery. First series launch in S400 hybrid); ATZ 111 (2009); 490 ff], an available dead volume of approx. 2 l between the used round cells is filled with sealing compound. These sealing compounds, however, considerably increase the mass of the entire battery system, because 1 l of sealing compound weighs approx. 1.4 kg. In addition, this embodiment is expensive and its handling during the production is difficult and time-consuming, because the sealing compounds consisting of two components can cross-link and/or must be cross-linked. This embodiment furthermore prevents the partial exchange or replacement, respectively, of individual cells or modules during maintenance or repair.

Even though the mentioned embodiment can still be converted in the case of relatively small batteries, such as "mild hybrid batteries", but leads to masses and costs, which are no longer operable in the case of large batteries, as they are used for pure electric vehicles.

In the event that the dead volume is not filled with solid or liquid substances, respectively, and the battery is in particular not sealed hermetically, temperature fluctuations can cause a material volume replacement with the surroundings. In response to the cool-down of the battery, it can suck in air. Moisture as well as dust can hereby be drawn into the interior of the battery. The moisture can condense in the interior of the battery. This is particularly critical because the water accumulation can lead to short-circuits and corrosion.

These replaced air volumes are low. In the case of a temperature difference of 50 K and a volume of 5 l, the replaced air volume is 50/300*5 l, thus approximately 1 l. The air flows occurring thereby are very low; that is to say, they are approximately 1 l/h.

A further demand on battery systems lies in that combustible gases, which are released in case of an emergency, either remain securely in the battery housing or are securely and specifically discharged or set, respectively.

Current embodiments use a permeable pressure compensation element in the battery housing. A pressure compensation element allows for a material replacement between the interior of the battery and the surroundings. Microporous membranes, for example made of "Gore-Tex" are currently used here above all, because they also effectively prevent the permeation of particles and liquid water in addition to a material replacement. In the case of such an embodiment, however, water can enter into the interior of the battery housing in a gaseous state and can condense there. The condensed water can then no longer reach towards the outside through the microporous membrane and thus accumulates in the interior of the housing.

This also leads to the danger of corrosion at the electric contacts as well as to short-circuits of the power electronics. Both lead to a breakdown of the battery.

The mentioned problem is even worse when, in addition to the condensed water, gaseous saliferous substances reach into the interior of the battery. For example, hydrogen chloride (HCl) reacts with the condensed water to form hydrochloric acid, which has an extremely corrosive effect. This can lead to pitting corrosion here. Furthermore, the electric conductivity of the water is increased drastically, which in turn increases the risk of electric short-circuits.

An improved embodiment uses the attachment of filters or filter and dehumidifying elements, respectively. With these measures, water can be caught even in the gaseous state and/or can be set. The water can thus not reach the interior of the battery.

In the case of these embodiments, it is disadvantageous that they do not permanently close the interior of the battery housing. The water-setting capacity is exhausted after a certain time. The dehumidifying element is thus a wear component, which must be replaced, depending on humidity and period of use. It must furthermore be absolutely ensured that the dehumidifying element is not contaminated with water, which is present at the outside. This water can appear as wade water in the case of vehicle batteries, in the case of vehicle batteries in high-pressure cleaners or in the case of washer systems.

SUMMARY

This section provides a general summary of the disclosure, and is not a comprehensive disclosure of its full scope or all of its features.

The present disclosure is thus based on the object of specifying an energy storage, in the case of which a problem-free pressure compensation with permanently high impermeability is ensured.

According thereto, the afore-mentioned energy storage is characterized in that a volume compensation device, which compensates pressure differences between the interior of the storage housing and the surroundings without a material replacement between surroundings and interior of the storage housing, is assigned to the storage housing.

According to the present disclosure, the volume compensation device compensates typical pressure fluctuations, which are caused by temperature changes. A material replacement does not take place subsequently between the interior of the storage housing and the surroundings under normal operating conditions. The pressure differences between the interior and the external surroundings of the storage housing, which are caused by temperature fluctuations, are compensated for, wherein the cells within the storage housing are not subject to mechanical stress caused by considerably different pressure differences, which would prevail between a hermetically closed, isochore interior of the storage housing and the surrounds thereof. Furthermore, the interior of the storage housing is sealed permanently, because a material replacement between the interior of the storage housing and the surroundings thereof does not take place. The afore-mentioned object is thus solved.

The volume compensation device could be arranged within the storage housing. A compensation possibility can hereby be realized in two dimensions. The concrete embodiment has the advantageous effect that the volume compensation device is protected by the fixed storage housing. Furthermore, dead volume in the energy storage, in particular in a battery, is used advantageously.

Alternatively, the volume compensation device could be arranged on the outside of the storage housing. The volume compensation device can hereby be checked for damages without any problems.

The volume compensation device could be arranged outside of the storage housing at a distance therefrom. In the case of this concrete embodiment, the volume compensation device could be material-connected to the storage housing by means of a hose or a tube. This arrangement is advantageous when sufficient space is not available in the immediate surroundings of the storage housing or in the event that other free spaces can be included, respectively. Advantages can further arise in the event that a burst function, which will be defined in detail below, is to be integrated. Combustible or toxic gas, respectively, which is created, can be removed from the energy storage, in particular from a battery, can be kept away from hot parts or, if need be, can even be removed from the passenger compartment of a motor vehicle by means of separating the volume compensation device from the storage housing.

Provision could be made for a volume compensation device, which encompasses a flexible part, which surrounds a volume, in which and/or from which air can be provided for compensating temperature fluctuations.

Against this background, the volume compensation device could encompass an expansive balloon. This provides for a volume compensation in three dimensions. The balloon could be accommodated in a rigid accommodation. This provides for a space-saving volume compensation in two dimensions. Against this background, the balloon could interact with a piston or with a roll membrane.

The volume compensation device could encompass an expansive bellows. A bellows can be moved in two dimensions and can be folded in a very flat and thus space-saving manner.

The volume compensation device could encompass a roll membrane. Roll membranes can be guided very well on walls.

The volume compensation device could encompass a bladder storage. This concrete embodiment realizes a compensation possibility in three dimensions, wherein one compensation possibility can preferably proceed in one or also in two dimensions.

Against this background, the volume compensation device could encompass an accumulator. This can compensate very high pressure differences.

The volume compensation device could encompass a movable housing lid. A compact design of the battery with few parts is ensured through this, because the housing lid represents a component, which is already present. The housing lid is moved advantageously and is arranged in a fluidically tight manner at the storage housing by means of a revolving seal. A pressure change leads to a lifting or lowering of the housing lid. This concrete embodiment is particularly advantageous, because only relatively small displacement heights of the housing lid become necessary for a pressure compensation due to the routinely large surfaces of the storage housing or of the housing lid, respectively. Against this background, the revolving seal can be provided with an O-shaped cross section, but can also be embodied so as to be molded.

Against this background, the housing lid could encompass a revolving, bellows-like seal, wherein the seal projects into the interior of the storage housing or into the surroundings of the storage housing. Through this, the housing lid can be moved without high mechanical resistance. Advantageously, the bellows-like seal is embodied as a revolving fold seal. It leads to a material seal in the compression-loaded, lowered state as well as in the pressure-compensated, lifted state. The fold seal can thereby either project in outward direction or in inward direction.

The volume compensation device could encompass a filter element. It is ensured through this that virtually no particles enter into a changeable compensation volume, in particular of a bellows.

The volume compensation device could encompass an absorber element. Damaging gases can be accommodated in an absorber element.

The volume compensation device could encompass a valve. In the case of a breakdown, gaseous substances can be released in the energy storage, in particular in a battery. These substances comprise blown-off electrolytes or decomposition products. The volumes of gaseous substances, which are released per faulty cell, are typically more than 5 l. These volumes are released within relatively short times, namely in less than one minute. This then leads to an abnormal pressure increase within the storage housing. Depending on the available dead volume, the storage housing can be designed mechanically such that it still tolerates the excess pressures occurring thereby. Such a design, however, would be difficult and would fail no later than in response to the failure of a plurality of cells. This would then lead to an uncontrolled blow process. This could possibly even lead to an explosion. In the case of normal, relatively small pressure differences between the interior of the storage housing and the surroundings thereof, the valve described herein does not yet trigger. In the case of abnormal larger pressure differences, gases in the interior of the battery are safely discharged.

The valve could encompass a valve piston. Advantageously, the valve piston can be connected to a spring and, in response to larger pressures in the interior of the storage housing, can reversibly release an outlet, through which the excess pressure can escape. The discharge of the possibly combustible and toxic gases can then take place through a hose or a tube.

The valve could encompass a burst disk or could be designed as burst disk. Advantageously, a burst disk opens in response to a defined pressure in the interior of the storage housing and quickly discharges gas from the inside to the outside. The burst disk can be combined with a hose or a filter element.

The valve could encompass an absorber element. Harmful gases can be accommodated in an absorber element. Against this background, the escaping gases could be accommodated in a special absorber element, in particular in a filter element or in a porous packed bed. Through this, the surroundings can be spared from the escaping gases for the most part.

The roll membrane, the bellows, the bladder storage, the piston, the accumulator or the bellows-like seal could be made of elastomers. This material lends a suitable elasticity to the mentioned components.

The electrochemical energy storage described herein can be embodied as a battery or a super capacitor. Here, the individual capacitor cells are also housed in a large housing and are subject to the same afore-mentioned problems.

There are now various possibilities for embodying and further developing the teaching of the present disclosure in an advantageous manner. For this, reference is to be made to the subsequent explanation of preferred exemplary embodiments of the disclosure by means of the drawings.

Generally, preferred embodiments and further developments of the teaching are also explained in combination with the explanation of the preferred exemplary embodiments of the present disclosure by means of the drawings.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 15 shows a schematic view of a volume compensation device, which encompasses a bellows comprising a burst disk;

FIG. 16 shows a schematic view of a volume compensation device, which encompasses a roll membrane comprising a burst disk;

Figure 1:
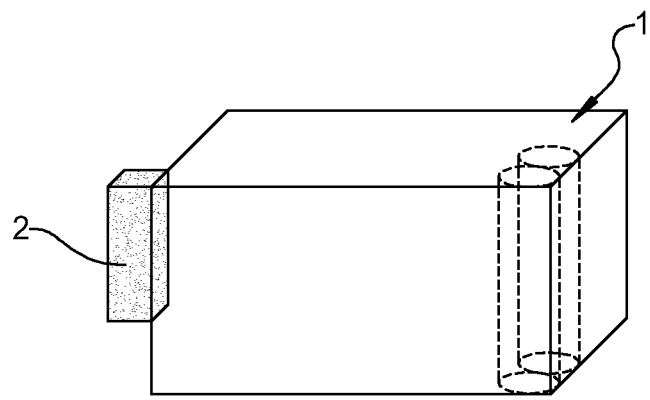
FIG. 1 shows a schematic view of an energy storage device, the storage housing of which is assigned to a volume compensation device.

FIG. 17 shows a schematic view of a volume compensation device, which encompasses a movable housing lid, wherein an O-ring seal is arranged as frame seal between the housing lid and the storage housing; and FIG. 18 shows a schematic view of a volume compensation device, which encompasses a movable housing lid, wherein a bellows-like seal, which projects into the interior of the storage housing or into the surroundings of the storage housing, is arranged between housing lid and storage housing.

Corresponding reference numerals indicate corresponding parts throughout the several views of the drawings.

DETAILED DESCRIPTION

Example embodiments will now be described more fully with reference to the accompanying drawings.

FIG. 1 shows a schematic view of an energy storage device, to the storage housing 1 of which a volume compensation unit 2 is assigned. The storage housing 1 encases a volume in which battery cells (a few of which are shown) are accommodated.

Figure 2:
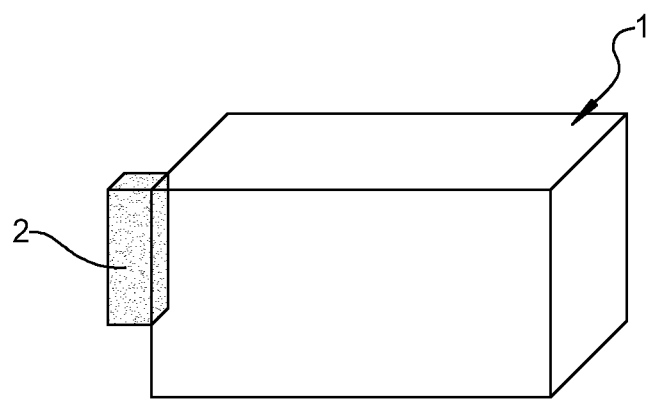
FIG. 2 shows a schematic view of an energy storage device, wherein a volume compensation device is arranged outside of the storage housing.

FIG. 2 shows a schematic view of an energy storage device, wherein the volume compensation device 2 is arranged outside of the storage housing 1.

Figure 3:
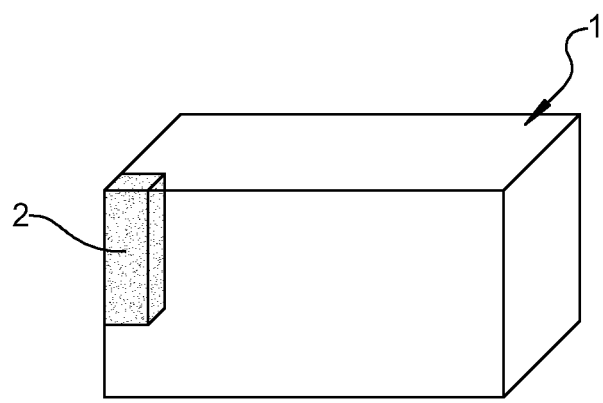
FIG. 3 shows a schematic view of an energy storage device, wherein a volume compensation device is arranged within the storage housing.

FIG. 3 shows a schematic view of an energy storage device, wherein the volume compensation device 2 is arranged within the storage housing 1.

Figure 4:
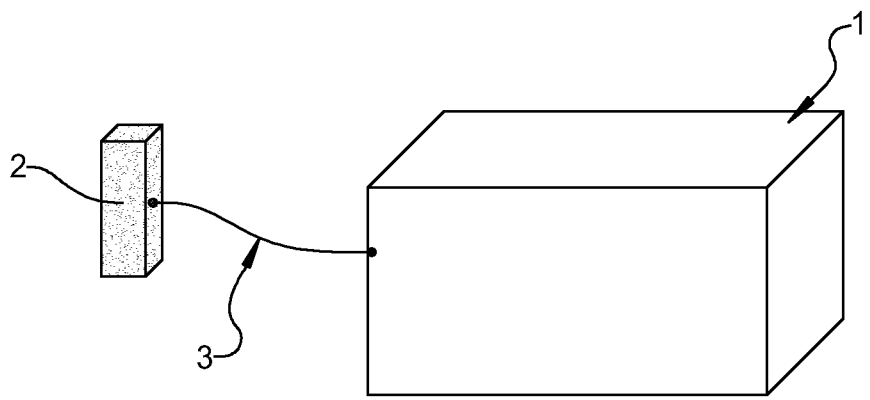
FIG. 4 shows a schematic view of an energy storage device, wherein a volume compensation device is arranged so as to be spaced apart from the storage housing by means of a hose or a tube.

FIG. 4 shows a schematic view of an energy storage device, wherein the volume compensation device 2 is arranged so as to be spaced apart from the storage housing 1 by means of a hose 3 or by means of a non-illustrated tube 4.

Figure 5:
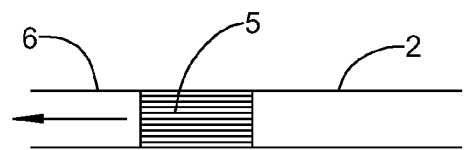
FIG. 5 shows a schematic view of a volume compensation device, which encompasses a piston.

FIG. 5 shows a schematic view of a volume compensation device 2, which encompasses a piston 5. The piston 5 is accommodated in a piston housing 6 and can thus be moved in two dimensions.

Figure 6:
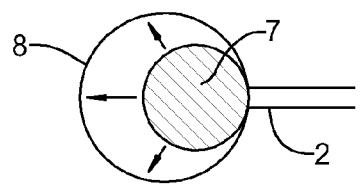
FIG. 6 shows a schematic view of a volume compensation device, which encompasses a balloon.

FIG. 6 shows a schematic view of a volume compensation device 2, which encompasses a balloon 7. The balloon 7 is located in a balloon housing 8 and is expansive therein in three dimensions. It is also possible for the balloon 7 to be used without balloon housing 8.

Figure 7:
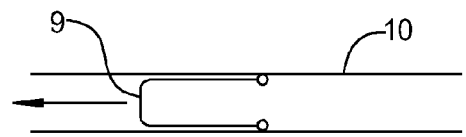
FIG. 7 shows a schematic view of a volume compensation device, which encompasses a roll membrane.

FIG. 7 shows a schematic view of a volume compensation device 2, which encompasses a roll membrane 9. The roll membrane 9 is located in a roll membrane housing 10 and can be moved in two dimensions.

Figure 8:
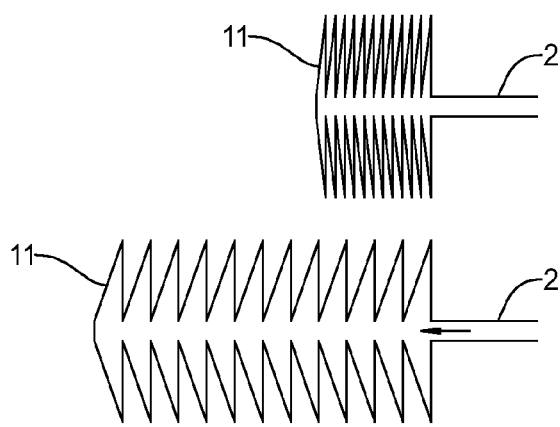
FIG. 8 shows a schematic view of a volume compensation device, which encompasses a bellows, wherein the compressed bellows is shown in the upper view and the expanded bellows is shown in the lower view.

FIG. 8 shows a schematic view of a volume compensation device 2, which encompasses a bellows 11, wherein the compressed bellows 11 is shown in the upper view and the expanded bellows 11 is shown in the lower view.

Figure 9:
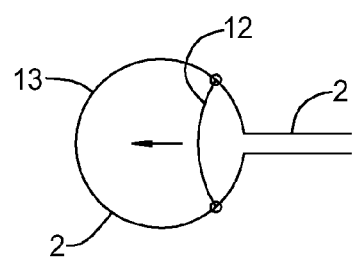
FIG. 9 shows a schematic view of a volume compensation device, which encompasses a membrane in a housing according to the type of an accumulator or bladder storage.

FIG. 9 shows a schematic view of a volume compensation device 2, which encompasses a membrane 12 in a membrane housing 13 according to the type of an accumulator or bladder storage.

Figure 10:
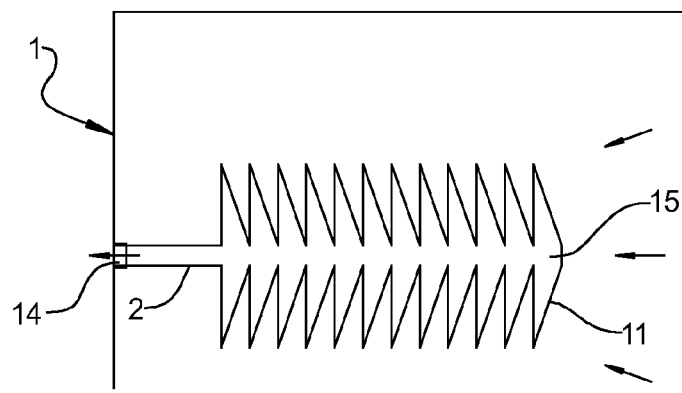
FIG. 10 shows a schematic view of a volume compensation device, which is arranged within a storage housing and which encompasses a bellows, wherein a filter element is optionally arranged between the surroundings and the interior of the bellows.

FIG. 10 shows a schematic view of a volume compensation device 2, which is arranged within a storage housing 1 and which encompasses a bellows 11, wherein a filter element 14 is arranged between the surroundings and the interior of the bellows 11. The bellows 11 is located in the interior of the storage housing 1. The compensation volume 15 of the bellows 11 is protected from permeating particles. It is also possible to operate the bellows 11 without a filter element 14.

Figure 11:
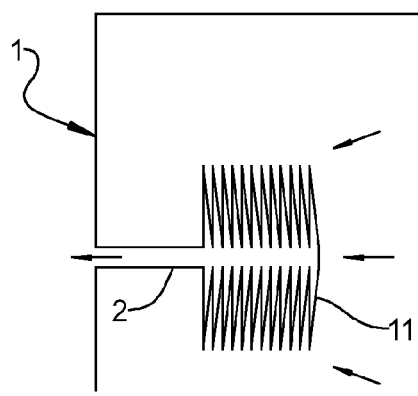
FIG. 11 shows a schematic view of the volume compensation device illustrated in FIG. 10, which is arranged within a storage housing and which encompasses a bellows in response to increased inner pressures.
Figure 12:
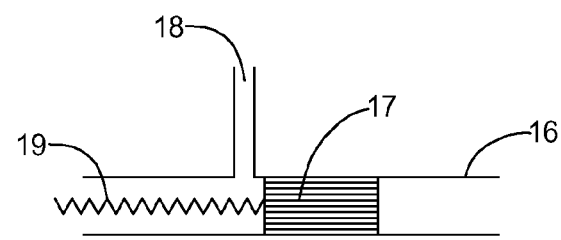
FIG. 12 shows a schematic view of a valve for reducing an excess pressure.

FIG. 11 shows a schematic view of the volume compensation device 2, which is arranged within a storage housing 1 and which encompasses a bellows 11, which is compressed to accommodate an increased volume of a remainder of the contents of the energy storage device;

FIG. 12 shows a schematic view of a valve 16 for reducing an excess pressure. The valve 16 encompasses a spring-loaded valve piston 17, which can release or close an outlet. The valve piston 17 is loaded by means of the spring 19.

Figure 13:
FIG. 13 shows a schematic view of the valve according to FIG. 12, illustrating how a fluid escapes from the interior of the storage housing.

FIG. 13 shows a schematic view of the valve 16 according to FIG. 12, illustrating how a fluid escapes from the interior of the storage housing 1, which is not illustrated.

Figure 14:
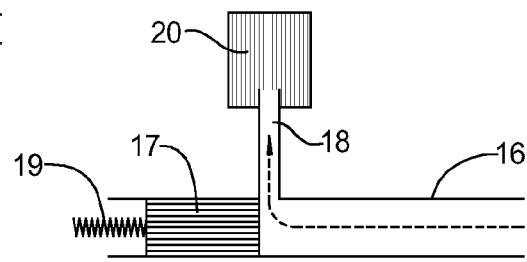
FIG. 14 shows a schematic view of the valve according to FIG. 12, illustrating how a fluid escapes into an absorber element from the interior of the storage housing.

FIG. 14 shows a schematic view of the valve 16 according to FIG. 12, wherein it is illustrated how a fluid escapes into an absorber element 20 from the interior of the storage housing.

FIG. 15 shows a schematic view of a volume compensation device 2, which encompasses a bellows 11 comprising a burst disk 21 which can open in response to a sudden large increase in pressure;

FIG. 16 shows a schematic view of a volume compensation device 2, which encompasses a roll membrane 9 comprising a burst disk 21 which can open in response to a sudden large increase in pressure;

FIG. 17 shows a schematic view of a volume compensation device 2, which encompasses a movable housing lid 22, wherein a frame seal 23 is arranged between housing lid 22 and storage housing 1.

FIG. 18 shows a schematic view of a volume compensation device 2, which encompasses a movable housing lid 22, wherein a bellows-like seal 24, which projects into the interior (shown at right of Figure) of the storage housing 1 or into the surroundings (shown at left of Figure) of the storage housing 1, is arranged between housing lid 22 and storage housing 1. FIG. 18 shows both embodiments of the projection in a schematic view.

The energy storage device described in the figures is preferably embodied as a battery, in particular as a motor vehicle battery and including the well known contents thereof. The storage housing 1 is preferably embodied as a battery housing. Alternatively, the energy storage device can be embodied as a super capacitor with the well known contents thereof.

With reference to further advantageous embodiments and further developments of the teaching according to the present disclosure, reference is made on the one hand to the general part of the description and, on the other hand, to the enclosed patent claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrochemical energy storage device comprising:
   a storage housing, which encases a volume, in which cells are accommodated;
   wherein the storage housing protects the volume from the surroundings, characterized in that a volume compensation device is assigned to the storage housing;
   said volume compensation device compensates for pressure differences between the interior of the storage housing and the surroundings without a material exchange taking place between the surroundings and the interior of the storage housing, characterized in that the volume compensation device is arranged outside of the storage housing at a distance therefrom.

2. An electrochemical energy storage device comprising:
   a storage housing, which encases a volume, in which cells are accommodated;
   wherein the storage housing protects the volume from the surroundings, characterized in that a volume compensation device is assigned to the storage housing;
   said volume compensation device compensates for pressure differences between the interior of the storage housing and the surroundings without a material exchange taking place between the surroundings and the interior of the storage housing;
   wherein the volume compensation device encompasses an expansive balloon (7) disposed within a generally spherical balloon housing.

3. An electrochemical energy storage device comprising:
   a storage housing, which encases a volume, in which cells are accommodated;
   wherein the storage housing protects the volume from the surroundings, characterized in that a volume compensation device is assigned to the storage housing;
   said volume compensation device compensates for pressure differences between the interior of the storage housing and the surroundings without a material exchange taking place between the surroundings and the interior of the storage housing;
   wherein the volume compensation device encompasses an expansive bellows (11) disposed exterior of the storage housing.

4. An electrochemical energy storage device comprising:
   a storage housing, which encases a volume, in which cells are accommodated;
   wherein the storage housing protects the volume from the surroundings, characterized in that a volume compensation device is assigned to the storage housing;
   said volume compensation device compensates for pressure differences between the interior of the storage housing and the surroundings without a material exchange taking place between the surroundings and the interior of the storage housing;

wherein the volume compensation device encompasses a movable housing cover (22).

5. The energy storage device according to claim 4, wherein the housing cover (22) encompasses a revolving, bellows-like seal (24), wherein the seal (24) protrudes into the interior of the storage housing (1).

6. The energy storage device according to claim 4, wherein the housing cover (22) encompasses a revolving bellows-like seal (24), wherein the seal (24) protrudes into the surroundings of the storage housing.

7. An electrochemical energy storage device comprising:
a storage housing, which encases a volume, in which cells are accommodated;
wherein the storage housing protects the volume from the surroundings, characterized in that a volume compensation device is assigned to the storage housing;
said volume compensation device compensates for pressure differences between the interior of the storage housing and the surroundings without a material exchange taking place between the surroundings and the interior of the storage housing;
wherein the volume compensation device (2) encompasses a bellows disposed in the storage housing and having a filter element (14) arranged between the surroundings and an interior of the bellows.

8. An electrochemical energy storage device comprising:
a storage housing, which encases a volume, in which cells are accommodated;
wherein the storage housing protects the volume from the surroundings, characterized in that a volume compensation device is assigned to the storage housing;
said volume compensation device compensates for pressure differences between the interior of the storage housing and the surroundings without a material exchange taking place between the surroundings and the interior of the storage housing, wherein the volume compensation device (2) encompasses a valve piston (17) that is movable to open a passage (18) to allow volume compensation through the passage.

9. The energy storage device according to claim 3, wherein the bellows (11) encompasses a blow-out disk (21).

10. The energy storage device according to claim 8, wherein the volume compensation device (2) encompasses an absorber element (20) exterior of the valve piston.

11. The energy storage device according to claim 1, characterized by the electrochemical energy storage device being a battery.

12. The energy storage device according to claim 1, characterized by the electrochemical energy storage device being a super capacitor.

\* \* \* \* \*